Patented Aug. 16, 1932

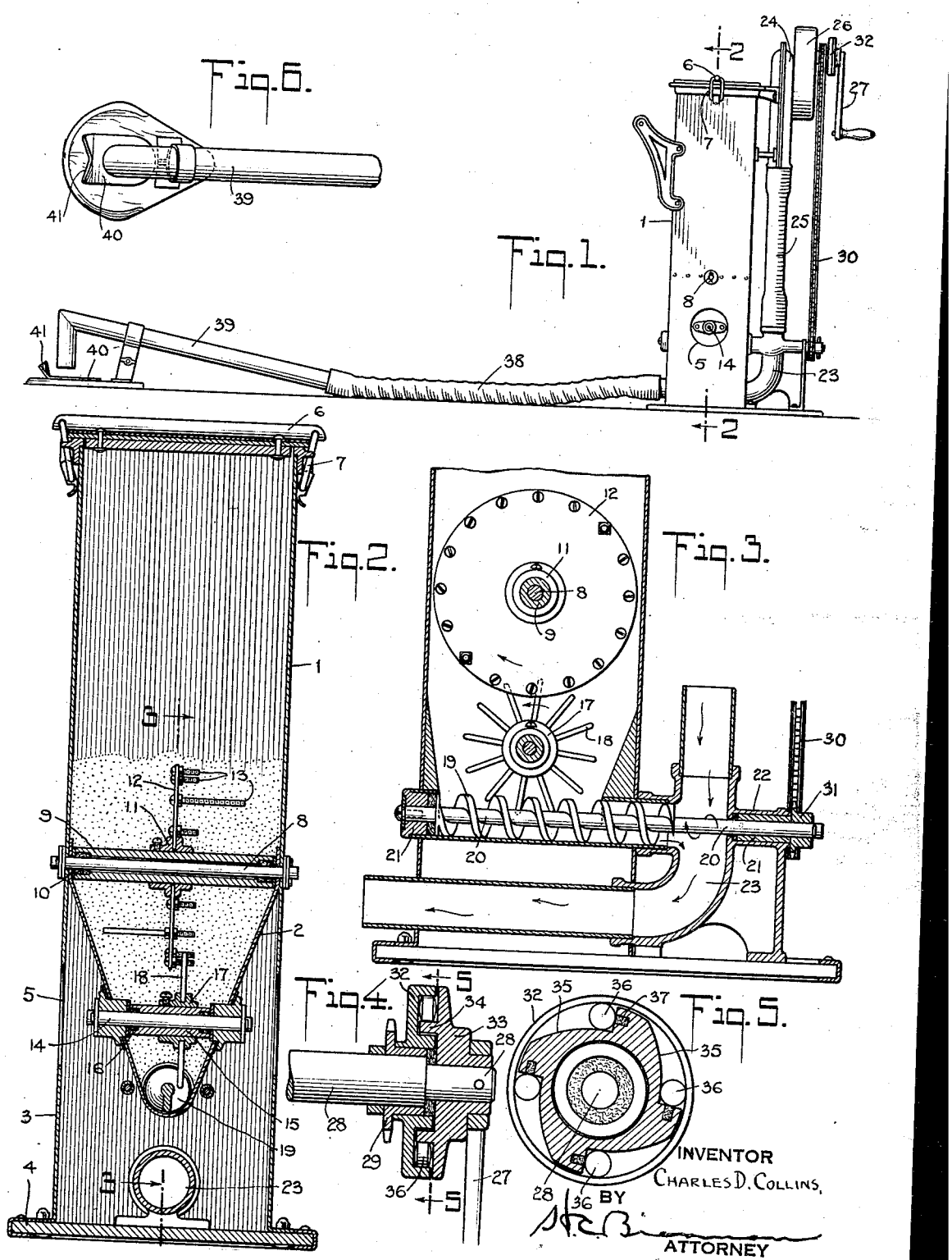

1,872,028

UNITED STATES PATENT OFFICE

CHARLES D. COLLINS, OF NEW YORK, N. Y., ASSIGNOR TO AMERICAN CYANAMID COMPANY, OF NEW YORK, N. Y., A CORPORATION OF MAINE

BLOWER DUSTING APPARATUS

Application filed December 17, 1928. Serial No. 326,678.

This invention relates to a mechanism for delivering predetermined and accurate dosages of powdered or dusted material of a fumigating nature.

In this art it is desirable in many instances to dust vegetation, for example, with a powdered fumigant such as calcium cyanide, which in combination with moisture will react to form hydrocyanic acid gas. In such a case it is extremely important that the operator know exactly how much dust he has applied, inasmuch as the hydrocyanic acid gas produced may be more or less than desired.

While the mechanism herein disclosed is designed primarily for the dusting of such a cyanide, yet obviously it is not limited thereto as any material may be used therein where it is desired to accurately deliver definite quantities thereof.

The invention includes a hopper for containing the material to be dusted, which hopper is provided with means for making the same fumigant tight. Agitators are provided within the lower portion of the hopper for preventing arching of the material to be ejected from the mechanism and to secure uniform settling.

Such agitators, therefore, insure the continuous feeding of the powdered material into the delivery means at the tapered bottom of the hopper.

The delivery means may conveniently take the form of a worm screw, the convolutions thereof engaging radial arms on an agitator wheel, the axis of which is at right angles to that of the delivery shaft. By means of this arrangement the above mentioned agitator is driven directly from the delivery means. It has been found advantageous to provide a second agitator above the first, the second mentioned agitator moving on an axis parallel to that of the first mentioned agitator but having arms at right angles thereto and engageable by the arms of the first mentioned agitator. In this way the second agitator is driven from the first and the first agitator driven from and by the delivery or feed worm.

The feed worm delivers the material into a discharge duct which may conveniently be formed as a single casting, the axis shaft of the delivery worm projecting through the duct and axis thereof for engagement with driving means.

Secured conveniently to the top of the hopper is a drive mechanism which includes a ratchet and roller mechanism of well known construction by means of which a handle may be made to rotate the feed or delivery worm shaft at will, but which drives the shaft of a fan at all times. The fan, regardless of direction of rotation of the operating handle, delivers air to the discharge duct and thereby blows the dusting material delivered from the feed screw out of the duct into a tube and from thence to a distributing mechanism of any desired type.

In this way rotation of the operating handle and worm may be calibrated so as to deliver definite quantities of dusting material from the hopper into the discharge duct, when the handle is rotated in one direction together with a requisite amount of air sufficient to blow the material out of the device. Operation of the handle in the opposite direction will, on the contrary, deliver only air to the discharge duct which insures the blowing out of the mechanism the entire amount of dusting material delivered into the duct.

The invention further consists in the novel construction, combination and arrangement of parts more fully described hereinafter and shown in the accompanying drawing.

In the drawing:

Fig. 1 is a front view of a device embodying the invention.

Fig. 2 is a sectional elevation along the line 2—2 of Fig. 1.

Fig. 3 is a sectional view along the line 3—3 of Fig. 2.

Fig. 4 is a sectional elevation showing the ratchet and roller mechanism.

Fig. 5 is a view on the line 5—5 of Fig. 4.

Fig. 6 is a plan detail of the distributing mechanism.

Referring now with particularity to the embodiment illustrated, there is shown at 1 a hopper of conventional form but which includes a tapered lower portion 2. The upper walls of the hopper may be extended downwardly as at 3 to form a standard mounted upon the base 4 to hold the entire mechanism in an upright position. The walls 3 are provided with suitable apertures 5 therein whereby access may be had to the mechanism therein. A quick acting cover 6 is located at the top of the hopper provided with suitable locking or latching devices 7. The above mechanism permits the hopper to be made fumigant tight as is desired.

Within the hopper 1 is located an axle 8 the ends of which project outside of the hopper and are secured in any desired manner. Upon the axle 8 is located a sleeve 9 the ends of which are recessed and contain absorbent material 10 such as felt or the like, impregnated with or containing graphite to lubricate the sleeve.

Fixed to the sleeve 9 is a split collar 11 which holds therebetween a disc 12 of substantially the full width of the hopper 1. Arms 13 are secured near the periphery of the disc 12 and at right angles to the surface thereof. This mechanism serves as an agitator and rotates about the stationary axle 8 when driven as hereinafter described.

Below the first mentioned agitator and in the restricted lower portion of the hopper a second axle 14 is provided upon which is mounted a sleeve 15 with felt bushings 16, also saturated with or containing graphite. Upon the sleeve 15 there is mounted a collar 17 carrying radial arms 18 of sufficient extent to engage the arms 13 carried by the agitator disc 12 located above. It is to be noted that the radial arms 18 extend at right angles to arms 13 so that thorough agitation of the material within the hopper takes place, arching is prevented and evenness of settling of the fumigant secured.

At the extreme bottom of the hopper is located a delivery worm in the form of a continuous helix 19 carried by shaft 20 supported in bearings 21, one end thereof projecting through a casting 22 which includes the discharge duct.

The radial arms 18 of the lower agitator are so arranged that each extends within a convolution of the helix 19 and is rotated as the worm is rotated.

Due to the arrangement shown particularly in Fig. 2 it will be seen that the dusting material within the hopper is continuously fed down into the feed screw and is discharged thereby into the duct 23.

Conveniently attached to the top of the hopper 1 is a casing or housing shown generally at 24, which includes a fan mechanism of any desired type, which is well known and to which no claim is here made. This fan is so arranged as to deliver air regardless of its direction of rotation into the tube 25 which connects with the discharge duct 23.

Suitably attached to the housing 24 is a gear case 26 which contains the usual gears for stepping up the ratio of rotation of the fan mechanism all of which is well known.

To the main driving gear (not shown) is attached a shaft 28 on which is mounted for free rotation a sprocket 29 carrying a driving chain 30 which engages a sprocket 31 on the projecting end of the feed worm shaft 20.

A dished element 32 is suitably secured to the sprocket 29 for rotation therewith. The operating handle 27 is pinned to the end of the shaft 28 and is likewise secured to ratchet mechanism 33 which is provided with a portion 34 projecting within the dished element 32. The projecting portion 34 of the ratchet 33 is provided with a series of surfaces 35 arcing toward the inner surface of the outer flange on the dished element 32. Between these surfaces 35 and the outer flange of the member 32 are located rollers 36 kept lubricated by the packing 37 in the ratchet proper.

It will thus be seen that clockwise rotation of the handle 27 will cause (Fig. 5) the rollers 36 to jam between the surfaces 35 and the outer flange on the element 32 with the result that the dished member 32 and the sprocket 29 are rotated with the shaft 28. As the fan within the housing 24 is always driven by rotation of the shaft 28 in either direction, air will thus be delivered to the discharge duct 23. As the sprocket 29 is connected to the feed shaft 20 through chain 30 and sprocket 31, this rotation of the handle will likewise cause a feed of dusting material into the duct. The air thus delivered blows the dusting material in a mixed condition through the flexible hose 38 and the discharge pipe 39 against a plate 40 having a bent portion 41 which causes a distribution over the area or object desired.

Rotation of the handle 27 in a counter-clockwise direction (Fig. 5) causes the rollers 36 to fall back into the larger portion of the space between the surfaces 35, and the inside of the outer flange of the dished member 32, which thus breaks the connection between the member 32 and the ratchet so that the sprocket 29 is not driven. For this reason only air is delivered to the discharge duct 23. This insures complete removal of dusting material from the duct through the distributing mechanism and out of the device.

It is contemplated that the ratio of sprockets will be so chosen that a unit dose may be delivered with four turns of the crank or handle. Obviously, by varying the size of the sprockets other dosages may be delivered, as this is entirely within the control of the operator.

In operation it is contemplated that the hopper will be filled with the desired quantity of material to be dusted, the cover tightly closed and rotation of the handle in the desired direction begun. It has been found that if the handle is rotated at a speed of at least one hundred or more revolutions per minute there will be sufficient air delivered from the fan to completely blow all of the dusting material out of the apparatus. If, however, the operator should be uncertain as to whether or not all of the fumigant was blown clear of the device, the duct and hose may be completely cleared by a few revolutions of the handle in the opposite direction.

I claim:

1. A dusting apparatus comprising a hopper, a plurality of agitators therein rotatable on parallel axes and in opposite directions, means to deliver material from the hopper to a discharge duct, and means to blow the delivered material out of said duct.

2. A dusting apparatus comprising a hopper, a plurality of rotatable agitators therein, each agitator having projecting arms thereon which extend at right angles to those of the other, means to deliver material from the hopper to a discharge duct, and means to blow said material out of said duct.

3. A dusting apparatus comprising a hopper, a plurality of rotatable agitators therein, each having projecting arms, the arms of one agitator meshing with those of the other, means to deliver material from the hopper to a discharge duct, and means to blow said material out of said duct.

4. A dusting apparatus comprising a hopper, a plurality of agitators within the hopper and having meshing arms; means to deliver material from the hopper to a discharge duct, the delivery means being operatively connected with the agitators to form a driving train within the hopper, and means to blow the delivered material out of the duct.

5. A dusting apparatus comprising a hopper tapering downwardly toward its bottom, a rotatable agitator extending into its untapered portion, a second agitator in its tapered portion, rotatable in an opposite direction, means at the bottom of the hopper for delivering material therefrom to a discharge duct, both of said agitators being driven from the delivery means, and means for blowing the delivered material out of said duct.

6. A dusting apparatus comprising a fumigant tight vertical hopper, means at the bottom thereof to deliver material to a discharge duct, means to blow air into said duct, a driving handle operatively connected to the material delivery means and the air blowing means, and means to break the connection between the handle and the material delivery means.

7. A dusting apparatus comprising a fumigant tight hopper, means at the bottom thereof to deliver material therefrom to a discharge duct, means to blow air into said duct, a driving handle operatively connected to the material and air delivery means, and a clutch between the handle and the material delivery means.

8. A dusting apparatus comprising a fumigant tight hopper, a worm at the bottom thereof for delivering material from the hopper to a discharge duct, means for blowing air past the end of the delivery worm and through said duct, common means to operate the material and air delivery mechanism, and a distributor at the end of the discharge duct.

9. A dusting apparatus comprising a fumigant tight hopper, two rotatable agitators therein, each of said agitators having projecting arms at right angles to those of the other, a worm at the bottom of the hopper for delivering material from the hopper to a discharge duct, the worm meshing with one agitator, which in turn is operatively connected with the other, the delivery worm having a shaft projecting through the duct, means connected to the projecting end of the worm shaft to drive the same, and means to blow material delivered to the duct out of the same.

In testimony whereof, I have hereunto subscribed my name this 13th day of December 1928.

CHARLES D. COLLINS.